United States Patent
Young et al.

(10) Patent No.: US 11,841,940 B2
(45) Date of Patent: Dec. 12, 2023

(54) PREEMPTIVE PROTECTION AGAINST MALICIOUS ARRAY ACCESS

(71) Applicant: Dell Products L.P., Round Rock, TX (US)

(72) Inventors: Susan E. Young, North Scituate, RI (US); Elie Jreij, Pflugerville, TX (US); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 230 days.

(21) Appl. No.: 17/377,845

(22) Filed: Jul. 16, 2021

(65) Prior Publication Data

US 2023/0014136 A1    Jan. 19, 2023

(51) Int. Cl.
*G06F 21/55* (2013.01)

(52) U.S. Cl.
CPC ........ *G06F 21/55* (2013.01); *G06F 2221/034* (2013.01)

(58) Field of Classification Search
CPC .................... G06F 21/50–568; G06F 2221/034
See application file for complete search history.

(56) References Cited

U.S. PATENT DOCUMENTS

| | | | | |
|---|---|---|---|---|
| RE46,768 E | * | 3/2018 | Hering | H04W 12/12 |
| 2012/0117348 A1 | * | 5/2012 | Triantafillou | G06F 21/566 |
| | | | | 711/163 |
| 2012/0254982 A1 | * | 10/2012 | Sallam | G06F 21/566 |
| | | | | 726/16 |
| 2018/0101678 A1 | * | 4/2018 | Rosa | G06F 21/32 |
| 2018/0295518 A1 | * | 10/2018 | Alloche | H04L 9/3268 |
| 2022/0138320 A1 | * | 5/2022 | Gehtman | G06F 3/067 |
| | | | | 726/24 |

* cited by examiner

*Primary Examiner* — Madhuri R Herzog
(74) *Attorney, Agent, or Firm* — Jackson Walker L.L.P.

(57) ABSTRACT

An information handling system may include at least one processor; a plurality of physical storage resources; and a network interface configured to communicatively couple the information handling system to a plurality of host systems; wherein the information handling system is configured to: determine a likelihood of compromise for each of the plurality of host systems; and in response to the likelihood of compromise for a particular host system exceeding a threshold likelihood, carry out a remedial action with respect to the particular host system, wherein the remedial action includes restricting access from the particular host system to the plurality of physical storage resources.

15 Claims, 1 Drawing Sheet

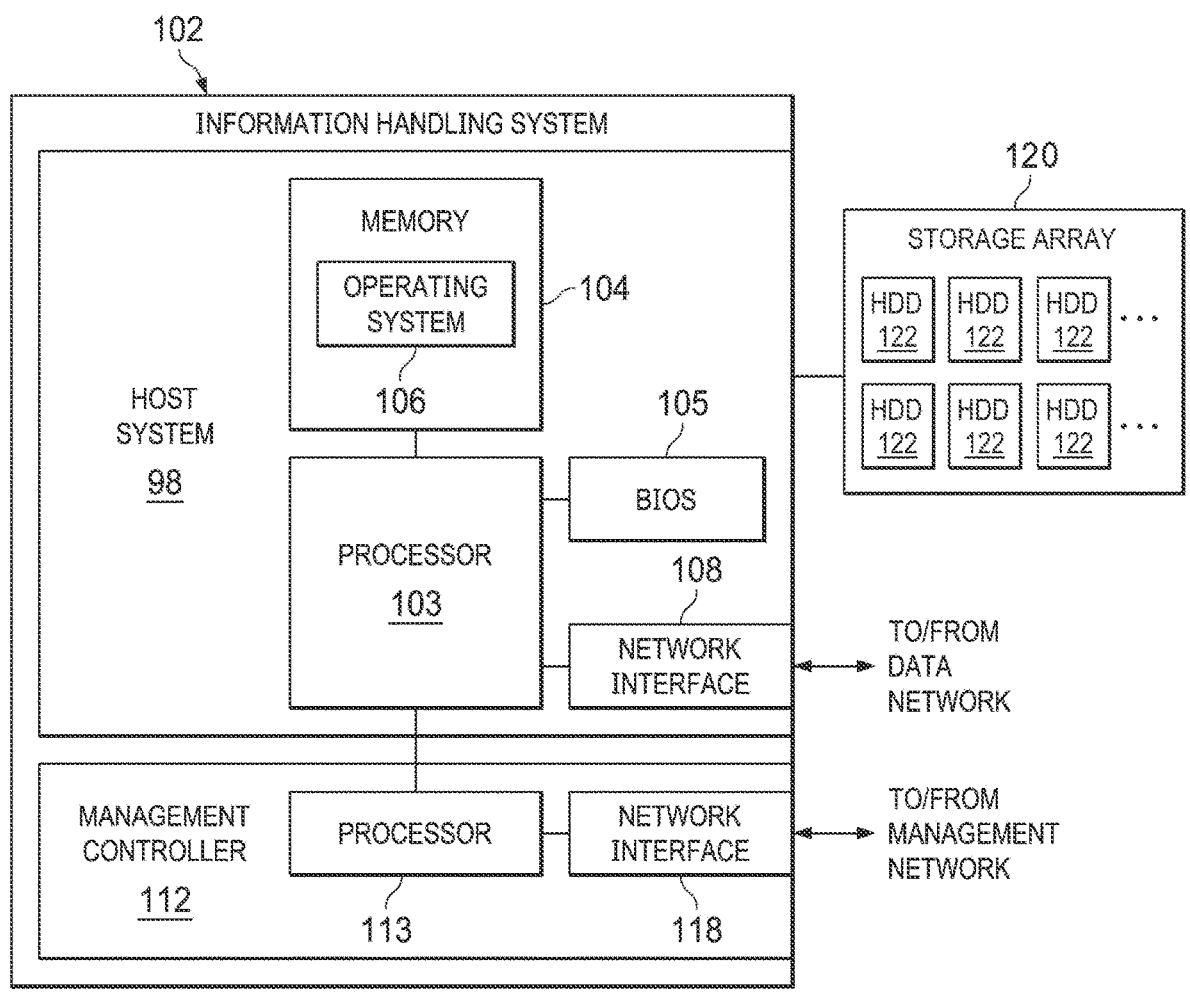

PREEMPTIVE PROTECTION AGAINST MALICIOUS ARRAY ACCESS

TECHNICAL FIELD

The present disclosure relates in general to information handling systems, and more particularly to detecting and preventing malicious access to storage arrays.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some situations, it may be advantageous for information handling systems to have shared access to an external data storage device such as an array of physical storage resources. For example, multiple information handling systems may be coupled via a network to such an array, and they may have read and/or write access to all or a portion of the storage space of such an array.

This may present a problem, however, if one of such information handling systems becomes compromised (e.g., by a hacker or other malicious user). When such an information handling system (also referred to herein as a host) is compromised, it can still access the data on the storage array. Thus data may be stolen or maliciously modified, erased, or encrypted (e.g., by ransomware). In particular, the storage array may have no way of detecting the security exposure of the host, and so it may not be equipped to revoke the host's access. This problem may be even more pronounced in an environment with many hosts, in which a compromised host may allow access to edge devices and then breach other associated arrays from there.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with malicious access to storage arrays in information handling systems may be reduced or eliminated.

In accordance with embodiments of the present disclosure, an information handling system may include at least one processor; a plurality of physical storage resources; and a network interface configured to communicatively couple the information handling system to a plurality of host systems; wherein the information handling system is configured to: determine a likelihood of compromise for each of the plurality of host systems; and in response to the likelihood of compromise for a particular host system exceeding a threshold likelihood, carry out a remedial action with respect to the particular host system, wherein the remedial action includes restricting access from the particular host system to the plurality of physical storage resources.

In accordance with these and other embodiments of the present disclosure, a method may include an information handling system that includes a plurality of physical storage resources communicatively coupling to a plurality of host systems; the information handling system determining a likelihood of compromise for each of the plurality of host systems; and in response to the likelihood of compromise for a particular host system exceeding a threshold likelihood, the information handling system carrying out a remedial action with respect to the particular host system, wherein the remedial action includes restricting access from the particular host system to the plurality of physical storage resources.

In accordance with these and other embodiments of the present disclosure, an article of manufacture may include a non-transitory, computer-readable medium having computer-executable code thereon that is executable by a processor of an information handling system that includes a plurality of physical storage resources, the code being executable for: communicatively coupling to a plurality of host systems; determining a likelihood of compromise for each of the plurality of host systems; and in response to the likelihood of compromise for a particular host system exceeding a threshold likelihood, carrying out a remedial action with respect to the particular host system, wherein the remedial action includes restricting access from the particular host system to the plurality of physical storage resources.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 illustrates a block diagram of an example information handling system, in accordance with embodiments of the present disclosure.

DETAILED DESCRIPTION

Preferred embodiments and their advantages are best understood by reference to FIG. 1, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives, solid-state drives, and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Information handling system 102 may further be coupled (e.g., via network interface 108) to storage array 120, which may include one or more physical storage resources 122, illustrated as hard disk drives (HDDs) in this example. In other embodiments, different types of physical storage resources such as flash or other solid-state resources may be included in storage array 120. Storage array 120 may also include other components (e.g., one or more processors, RAM, one or more network interfaces, etc.), which are not shown explicitly in FIG. 1 for the sake of clarity. Storage array 120 may be an information handling system (e.g., a storage server) in its own right, in some embodiments.

In general, any desired number of information handling systems 102 may be communicatively coupled to storage array 120. In some embodiments, storage array 120 may be accessible via multiple paths. In such embodiments, a Multipath I/O (MPIO) driver or other suitable storage driver may execute on processor 103 to manage communications between information handling systems 102 and storage array 120.

As noted above, problems can arise if one of the information handling systems 102 that is communicatively coupled to storage array 120 becomes compromised and retains access to storage array 120. Thus embodiments of this disclosure may provide methods to detect compromised hosts and take measures to protect storage array 120. Detection may be based on several factors, and the remediation actions to be taken may be based on configurable policies in some embodiments.

For example, in some embodiments, a factor that may be incorporated into compromise detection is the presence of an unauthorized OS, driver, or firmware (or an unauthorized version thereof) on information handling system 102. Such unauthorized code may be detected by management controller 112, which may communicate with storage array 120 via an MPIO or other suitable storage driver. A corresponding Compromise Severity Score (CSS) may be determined (e.g., as a number between 0 and 5) depending on how many versions have changed and the importance of the software and/or firmware that has changed.

In these and other embodiments, another factor that may be incorporated into compromise detection is the presence of security issues with current software and/or firmware versions. For example, management controller 112 or a software agent of host system 98 or an MPIO or other suitable storage driver may periodically connect to a cloud security repository to check for any known Common Vulnerabilities and Exposures (CVE) records or defects in the current versions installed on host system 98. A corresponding CSS may be determined (e.g., as a number between 0 and 5) depending on how severe the defects or CVEs are.

In these and other embodiments, another factor that may be incorporated into compromise detection is the presence of unexpected traffic behavior. In some embodiments, management controller 112 and/or an MPIO or other suitable storage driver may keep a history of network, storage, CPU, and/or other utilization patterns. If a new pattern is detected, then it may be an indication of compromised host. A corresponding CSS may be determined (e.g., as a number between 0 and 5) depending on how considerable the variance is from the normal pattern.

In these and other embodiments, another factor that may be incorporated into compromise detection is the presence of a host that differs from the majority of other hosts in some way. Customers with many hosts typically deploy the same hardware and drivers for most or all of their hosts, and so if one host deviates from the norm, that may be an indication of a compromised host. A corresponding CSS may be determined (e.g., as a number between 0 and 5) depending on how considerable the variance is from the majority of hosts.

The various different CSS numbers may be added up to determine the total CSS for a host. For example, in embodiments using the four different CSS numbers described above, the total may range from 0 to 20, where 0 means a very low likelihood of compromise, and 20 means a high likelihood of compromise. In other embodiments, different scoring metrics may be used to determine the overall likelihood of compromise. Further, in some embodiments, compromise detection may be complemented by cloud-based security and analytics tools if such tools are available.

In some embodiments, a configurable policy may determine what actions to take, and the actions may be selected based on the level of the total CSS. Any desired actions may be implemented, but some embodiments may include actions such as alerting an administrator, restricting the affected host to read-only access to the storage array, preventing the affected host from accessing the storage array at all, etc.

The actions above are listed in order of increasing severity, and they may correspond to different levels of total CSS. For example, a total CSS of 0 to 5 may generate alerts. A total CSS of 6 to 10 may restrict storage array access to read-only. A total CSS of 10 or greater may block access to the storage array.

Array access policies may be enforced by the MPIO kernel driver (or other suitable storage driver) which may also notify the storage array regarding the security breach and the actions to take. The storage array may then restrict or reject access as appropriate. Thus in various embodiments, access restrictions may be enforced at the host system, at the storage array, or both.

In some embodiments, when the security exposure is remediated, access to the array may automatically be restored. For example, the MPIO driver or other storage driver may report the remediation to the storage array, which may restore full access to the host.

In one embodiment, the restoration of access may be accomplished securely via the use of a random key. For purposes of this disclosure, the term "random key" should be understood to include a random or pseudorandom number or string, or in general any other suitable data that is not easily reproduced. When the security compromise is first detected, host system 98 may generate a random key and send it to both management controller 112 and storage array 120. This may be carried out by the MPIO or other suitable storage driver, a software agent, or any other suitable component executing on host system 98.

After transmitting the random key to management controller 112 and storage array 120, host system 98 may delete the random key from memory 104 so that no record of it is retained in host system 98. In some embodiments, host system 98 may also inform management controller 112 what issue is the source of the potential compromise (for example, what specific software or firmware version led to a high total CSS).

When the issue is fixed and the fix is confirmed by management controller 112, then management controller 112 may send the random key to the MPIO or other suitable storage driver, software agent, or other suitable component mentioned above, and such component may then use the key to request that storage array 120 resume communication. Upon receiving the random key, storage array 120 may resume communication. In other embodiments, management controller 112 may transmit the random key to storage array 120 instead of via the component executing on host system 98.

As long as management controller 112 has not also been compromised, this procedure may ensure that the compromised host does not maliciously initiate a resume before the security issues are fixed.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
    at least one processor;
    a plurality of physical storage resources; and
    a network interface configured to communicatively couple the information handling system to a plurality of host systems;
    wherein the information handling system is configured to:
    determine a likelihood of compromise for each of the plurality of host systems;
    in response to the likelihood of compromise for a particular host system exceeding a threshold likelihood, carry out a remedial action with respect to the particular host system, wherein the remedial action includes restricting access from the particular host system to the plurality of physical storage resources;
    receive a random key associated with the likelihood of compromise; and
    in response to the random key, restore access from the particular host system to the plurality of physical storage resources.

2. The information handling system of claim 1, wherein the information handling system is accessible via Multipath Input/Output (MPIO).

3. The information handling system of claim 1, further configured to notify a user prior to carrying out the remedial action.

4. The information handling system of claim 1, wherein the likelihood of compromise is based on at least one factor selected from the group consisting of a presence of unauthorized code executing on the particular host system, a presence of a known security issue with code executing on the particular host system, a presence of unexpected traffic behavior from the particular host system, a difference in hardware or software between the particular host system and other host systems of the plurality of host systems.

5. The information handling system of claim 1, wherein:
    in response to the likelihood of compromise being in a first range, the access from the host to the plurality of physical storage resources is restricted to read-only access; and
    in response to the likelihood of compromise being in a second range, the access from the host to the plurality of physical storage resources is disabled.

6. A method comprising:
- an information handling system that includes a plurality of physical storage resources communicatively coupling to a plurality of host systems;
- the information handling system determining a likelihood of compromise for each of the plurality of host systems;
- in response to the likelihood of compromise for a particular host system exceeding a threshold likelihood, the information handling system carrying out a remedial action with respect to the particular host system, wherein the remedial action includes restricting access from the particular host system to the plurality of physical storage resources;
- the information handling system receiving a random key associated with the likelihood of compromise; and
- in response to the random key, the information handling system restoring access from the particular host system to the plurality of physical storage resources.

7. The method of claim 6, wherein the information handling system is accessible via Multipath Input/Output (MPIO).

8. The method of claim 6, further comprising the information handling system notifying a user prior to carrying out the remedial action.

9. The method of claim 6, wherein the likelihood of compromise is based on at least one factor selected from the group consisting of a presence of unauthorized code executing on the particular host system, a presence of a known security issue with code executing on the particular host system, a presence of unexpected traffic behavior from the particular host system, a difference in hardware or software between the particular host system and other host systems of the plurality of host systems.

10. The method of claim 6, wherein:
- in response to the likelihood of compromise being in a first range, the access from the host to the plurality of physical storage resources is restricted to read-only access; and
- in response to the likelihood of compromise being in a second range, the access from the host to the plurality of physical storage resources is disabled.

11. An article of manufacture comprising a non-transitory, computer-readable medium having computer-executable code thereon that is executable by a processor of an information handling system that includes a plurality of physical storage resources, the code being executable for:
- communicatively coupling to a plurality of host systems;
- determining a likelihood of compromise for each of the plurality of host systems;
- in response to the likelihood of compromise for a particular host system exceeding a threshold likelihood, carrying out a remedial action with respect to the particular host system, wherein the remedial action includes restricting access from the particular host system to the plurality of physical storage resources;
- receiving a random key associated with the likelihood of compromise; and
- in response to the random key, restoring access from the particular host system to the plurality of physical storage resources.

12. The article of claim 11, wherein the information handling system is accessible via Multipath Input/Output (MPIO).

13. The article of claim 11, wherein the code is further executable for notifying a user prior to carrying out the remedial action.

14. The article of claim 11, wherein the likelihood of compromise is based on at least one factor selected from the group consisting of a presence of unauthorized code executing on the particular host system, a presence of a known security issue with code executing on the particular host system, a presence of unexpected traffic behavior from the particular host system, a difference in hardware or software between the particular host system and other host systems of the plurality of host systems.

15. The article of claim 11, wherein:
- in response to the likelihood of compromise being in a first range, the access from the host to the plurality of physical storage resources is restricted to read-only access; and
- in response to the likelihood of compromise being in a second range, the access from the host to the plurality of physical storage resources is disabled.

* * * * *